Jan. 16, 1951 G. A. FERRELL 2,538,359
LAWN MOWER
Filed April 1, 1947

INVENTOR.
George A. Ferrell,
BY
W. W. Williamson
Atty.

Patented Jan. 16, 1951

2,538,359

UNITED STATES PATENT OFFICE 2,538,359

LAWN MOWER

George A. Ferrell, York, Pa.

Application April 1, 1947, Serial No. 738,567

1 Claim. (Cl. 56—294)

My invention relates to a new and useful lawn mower and more particularly to the blades of the mower reel.

An object of the invention is to provide a lawn mower which will cut tall grass and weeds as well as short grass such as is generally maintained on lawns.

Another object of this invention is to provide means, as a part of the reel blades, to first cut off portions of the tall grass and weeds and subsequently finally cut down the stubble and shorter grass to the desired height with the reel and stationary blades.

Another object of the invention is to provide a lawn mower including a plurality of specially constructed blades as a reel rotating relative to and cooperating with a stationary blade, said first mentioned blades adapted to first partially cut off tall grass and weeds and finally further cut the remainder of the tall grass and weeds at the time of cutting any short grass or plants, the cutting actions being so related that a continuous process of cutting is accomplished.

A further object of the present invention is to construct the rotary blades in a manner to provide a cutting edge and lateral cutting teeth.

A still further object of this invention is to provide a number of spaced notches in the cutting edge of a blade of a lawn mower reel so that the side walls of said notches are at cutting edge and the faces of the blade.

Still another object of the invention is to provide notches in the cutting edge of a blade of a lawn mower reel, which notches extend into the blade at an approximately seventy-five degree angle to the cutting edge and on an approximately forty-five degree angle to the faces of the blade.

Still another object of the invention is to provide notches in the cutting edge of a blade of a lawn mower reel, which notches extend into the blade at an approximately seventy-five degree angle to the cutting edge and on an approximately forty-five degree angle to the faces of the blade.

With the above and other objects in view this invention consists of the details of construction and combination of elements hereinafter described and then designated by the claim.

In order that those skilled in the art to which this invention appertains may understand how to make and use the same I will describe its construction in detail referring by numerals to the accompanying drawing forming a part hereof, in which—

In carrying out my invention as herein embodied 10 represents a lawn mower comprising the usual necessary elements including a rotary cutting blade reel 11 containing a plurality of convolute blades 12 which progressively coact with the stationary blade 13 for cutting grass or articles that can be positioned between said stationary and any one of the reel blades.

Figure 4:
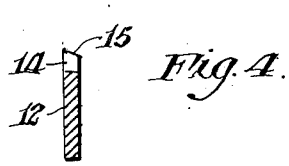
Fig. 4 is a section on the line 4—4 of Fig. 2.

Each blade 12 of the rotary wheel has a multiplicity of notches 14 formed in the cutting edge 15 thereof, which cutting edge is suitably beveled as shown particularly in Fig. 4. These notches are, preferably, equally spaced longitudinally of the outer or cutting edge of the blade and are formed undercut, with the side walls of said notches lying at approximately seventy-five degrees to the said outer or cutting edge and said side walls are formed approximately at forty-five degrees to the faces of the blade.

Figure 1:
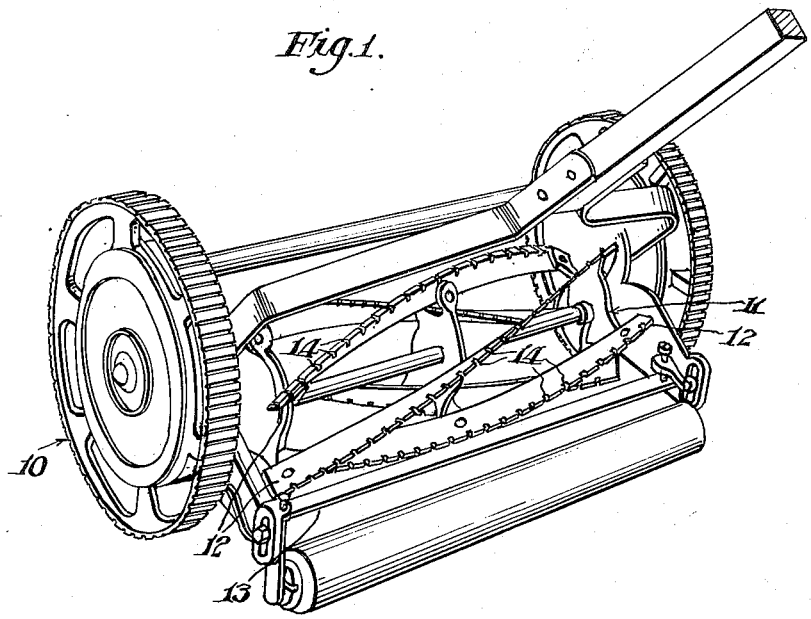
Fig. 1 is a perspective view of a lawn mower embodying my invention.
Figure 2:
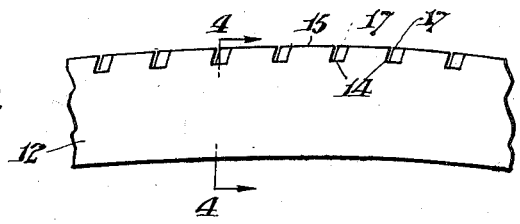
Fig. 2 is an enlarged face view of a portion of one of the rotary or reel blades.
Figure 3:
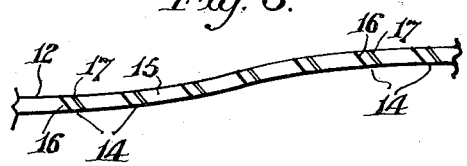
Fig. 3 is an outer edge view thereof.
Figure 5:
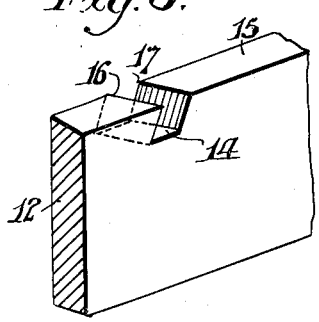
Fig. 5 is a further enlarged fragmentary perspective view of a blade in the region of one of the notches.

The formation of the notches in this manner produce a plurality of laterally angular short cutting edges 16 and companion teeth 17, Fig. 5, which act upon tall grass, weeds and the like to make a preliminary cut and sufficiently shorten the objects being cut so that the rotary blades can pass over the stubble and thereby position said stubble and any short grass or plants between the stationary and rotary blades.

In actual practice, the lawn mower is employed in the regular manner and as the rotary blades contact tall grass or weeds said grass or weeds will enter the notches and be cut off at an intermediate height and then be further cut off at a lower height by the rotary blades as the latter pass over the stationary blade and at the same time that any other shorter grass or plants are cut. Heretofore it has been almost if not absolutely impossible to cut tall grass and weeds with rotary blades on a horizontal axle but with my improvement the tall articles are cut twice, first to shear them off to a height where the rotary blades can pass over the remaining stubble and then finally cut down the stubble to the desired height.

Of course I do not wish to be limited to the exact details of construction herein shown and described as these may be varied within the scope of the appended claim without departing from the spirit of my invention.

Having described my invention what I claim as new and useful is:

In a lawn mower, a convolute blade adapted to rotate about a horizontal axle, and a multiplicity of lateral cutting edges spaced along one edge of said blade and produced by the formation of notches in said edge of the blade, the side walls of said notches being approximately forty-five degrees to the blade faces and approximately seventy-five degrees to the blade edge in which said notches are formed.

GEORGE A. FERRELL.

REFERENCES CITED

The following references are of record in the file of this patent:

UNITED STATES PATENTS

| Number | Name | Date |
|---|---|---|
| 221,640 | Whitcomb | Nov. 11, 1879 |
| 678,461 | Egan | July 16, 1901 |
| 902,187 | Warrenfeltz | Oct. 27, 1908 |
| 1,248,751 | Taylor | Dec. 4, 1917 |
| 1,662,849 | Dailey | Mar. 20, 1928 |
| 2,056,369 | Roessel | Oct. 6, 1936 |